US011167517B2

(12) United States Patent
Tsuruta et al.

(10) Patent No.: US 11,167,517 B2
(45) Date of Patent: Nov. 9, 2021

(54) POWDER COMPACTION MOLD AND METHOD FOR MANUFACTURING POWDER COMPACT

(71) Applicants: Sumitomo Electric Industries, Ltd., Osaka (JP); Sumitomo Electric Sintered Alloy, Ltd., Takahashi (JP)

(72) Inventors: Hijiri Tsuruta, Itami (JP); Tomoyuki Ueno, Itami (JP); Kazunari Shimauchi, Itami (JP)

(73) Assignees: Sumitomo Electric Industries, Ltd., Osaka (JP); Sumitomo Electric Sintered Alloy, Ltd., Takahashi (JP)

( * ) Notice: Subject to any disclaimer, the term of this patent is extended or adjusted under 35 U.S.C. 154(b) by 143 days.

(21) Appl. No.: 15/754,044

(22) PCT Filed: Aug. 22, 2016

(86) PCT No.: PCT/JP2016/074387
§ 371 (c)(1),
(2) Date: Feb. 21, 2018

(87) PCT Pub. No.: WO2017/033891
PCT Pub. Date: Mar. 2, 2017

(65) Prior Publication Data

US 2018/0290415 A1 Oct. 11, 2018

(30) Foreign Application Priority Data

Aug. 25, 2015 (JP) ................................ 2015-165721

(51) Int. Cl.
*B30B 15/02* (2006.01)
*B30B 11/02* (2006.01)
(Continued)

(52) U.S. Cl.
CPC .............. *B30B 15/022* (2013.01); *B22F 3/03* (2013.01); *B28B 3/083* (2013.01); *B30B 11/00* (2013.01); *B30B 11/02* (2013.01); *B30B 15/0017* (2013.01)

(58) Field of Classification Search
CPC ........ B30B 15/02–022; B30B 15/0017; B30B 11/00–02; B30B 11/08; B28B 3/083;
(Continued)

(56) References Cited

U.S. PATENT DOCUMENTS 2,026,940 A * 1/1936 Hendryx .................. B28B 7/44
264/102
3,676,030 A * 7/1972 Nowak .................... B22F 3/02
425/78
(Continued)

FOREIGN PATENT DOCUMENTS

EP 0999039 A2 * 5/2000 ........... B29C 43/361
EP 0999039 A2 5/2000
(Continued)

*Primary Examiner* — Duane Smith
*Assistant Examiner* — Austin Pollock
(74) *Attorney, Agent, or Firm* — Baker Botts L.L.P.; Michael A. Sartori

(57) ABSTRACT

A powder compaction mold includes a die and upper and lower punches configured to fit into the die and is configured to compress a powder between the upper and lower punches to manufacture a powder compact. Of the members forming the powder compaction mold, at least one of two members in sliding contact with each other has therein a vent passage through which gas is vented from a filling space for the powder surrounded by the die and the lower punch to an outside of the powder compaction mold. The vent passage has a gas intake port that is open to a clearance section formed between the two members and connecting to the filling space.

4 Claims, 13 Drawing Sheets

(51) Int. Cl.
*B30B 11/00* (2006.01)
*B30B 15/00* (2006.01)
*B22F 3/03* (2006.01)
*B28B 3/08* (2006.01)

(58) Field of Classification Search
CPC .. B28B 3/02; B28B 3/08; B28B 3/086; B28B 5/06; B22F 3/03; B29C 37/006; B29C 46/08
USPC .................. 425/345, 352, 420, 812; 264/102
See application file for complete search history.

(56) References Cited

U.S. PATENT DOCUMENTS

| | | | | | |
|---|---|---|---|---|---|
| 4,556,090 | A * | 12/1985 | Pujari | B22F 3/004 141/250 |
| 6,406,663 | B1 * | 6/2002 | Goransson | B30B 11/027 419/38 |
| 6,527,535 | B1 | 3/2003 | Han | |
| 2002/0025271 | A1 | 2/2002 | Goransson | |
| 2002/0090412 | A1 | 7/2002 | Kitamura et al. | |
| 2013/0320593 | A1 * | 12/2013 | Solty | B29C 43/361 264/319 |
| 2014/0232034 | A1 * | 8/2014 | Kusawake | B30B 15/0011 264/109 |
| 2016/0260542 | A1 * | 9/2016 | Kohno | C22C 38/002 |

FOREIGN PATENT DOCUMENTS

| | | | | | |
|---|---|---|---|---|---|
| EP | 1149689 | A2 | | 10/2001 | |
| JP | S62-009798 | A | | 1/1987 | |
| JP | 03291307 | A | * | 4/1990 | B30B 15/0011 |
| JP | S629798 | A | * | 8/1990 | B30B 15/0017 |
| JP | 03291307 | A | * | 12/1991 | B30B 15/0011 |
| JP | H07-232297 | A | | 9/1995 | |
| JP | H07232297 | A | * | 9/1995 | |
| JP | 10128594 | A | * | 5/1998 | B30B 15/0017 |
| JP | H10-118797 | A | | 5/1998 | |
| JP | H11-170094 | A | | 6/1999 | |
| JP | 2001-300789 | A | | 10/2001 | |
| JP | 2007196282 | A | * | 8/2007 | |
| JP | 2009-082957 | A | | 4/2009 | |
| WO | 2006/060906 | A1 | | 6/2006 | |
| WO | WO-2012147461 | A1 | * | 11/2012 | B22F 3/02 |
| WO | WO-2012147462 | A1 | * | 11/2012 | H01F 41/0246 |

* cited by examiner

POWDER COMPACTION MOLD AND METHOD FOR MANUFACTURING POWDER COMPACT

TECHNICAL FIELD

The present invention relates to powder compaction molds and methods for manufacturing powder compacts.

The present application claims priority to Japanese Patent Application No. 2015-165721, filed on Aug. 25, 2015, the entire contents of which are incorporated herein by reference.

BACKGROUND ART

PTL 1 discloses a powder compaction mold having a vent cut formed at an edge (i.e., a portion facing an inner peripheral surface of a die) of a punch on the compression surface side. The cut formed at the edge of the punch on the compression surface side allows gas present in a powder to be easily discharged into a clearance section between the die and the punch during the compression of the powder. Since the clearance section connects to the outside, the discharge of gas present in the powder can be promoted through the vent cut. This allows a powder compact with high density and sufficient strength to be manufactured without reducing the moving speed of the punch or increasing the punch compression time.

CITATION LIST

Patent Literature

PTL 1: Japanese Unexamined Patent Application Publication No. 2009-82957

SUMMARY OF INVENTION

A powder compaction mold according to the present disclosure is a powder compaction mold that includes a die and upper and lower punches configured to fit into the die and that is configured to compress a powder between the upper and lower punches to manufacture a powder compact, wherein, of the members forming the powder compaction mold, at least one of two members in sliding contact with each other has therein a vent passage through which gas is vented from a filling space for the powder surrounded by the die and the lower punch to an outside of the powder compaction mold, and wherein the vent passage has a gas intake port that is open to a clearance section formed between the two members and connecting to the filling space.

A method for manufacturing a powder compact according to the present disclosure is a method for manufacturing a powder compact using a powder compaction mold, wherein the powder compaction mold is the powder compaction mold according to the present disclosure, the method including:

a powder filling step of filling the filling space with the powder;

a press compaction step of compressing the powder between the upper and lower punches to obtain the powder compact; and a removal step of moving the die and the lower punch relative to each other to remove the powder compact from the powder compaction mold, wherein gas is vented from the filling space through the vent passage in at least one of the powder filling step, the press compaction step, and the removal step.

DESCRIPTION OF EMBODIMENTS

Technical Problem

Figure 1:
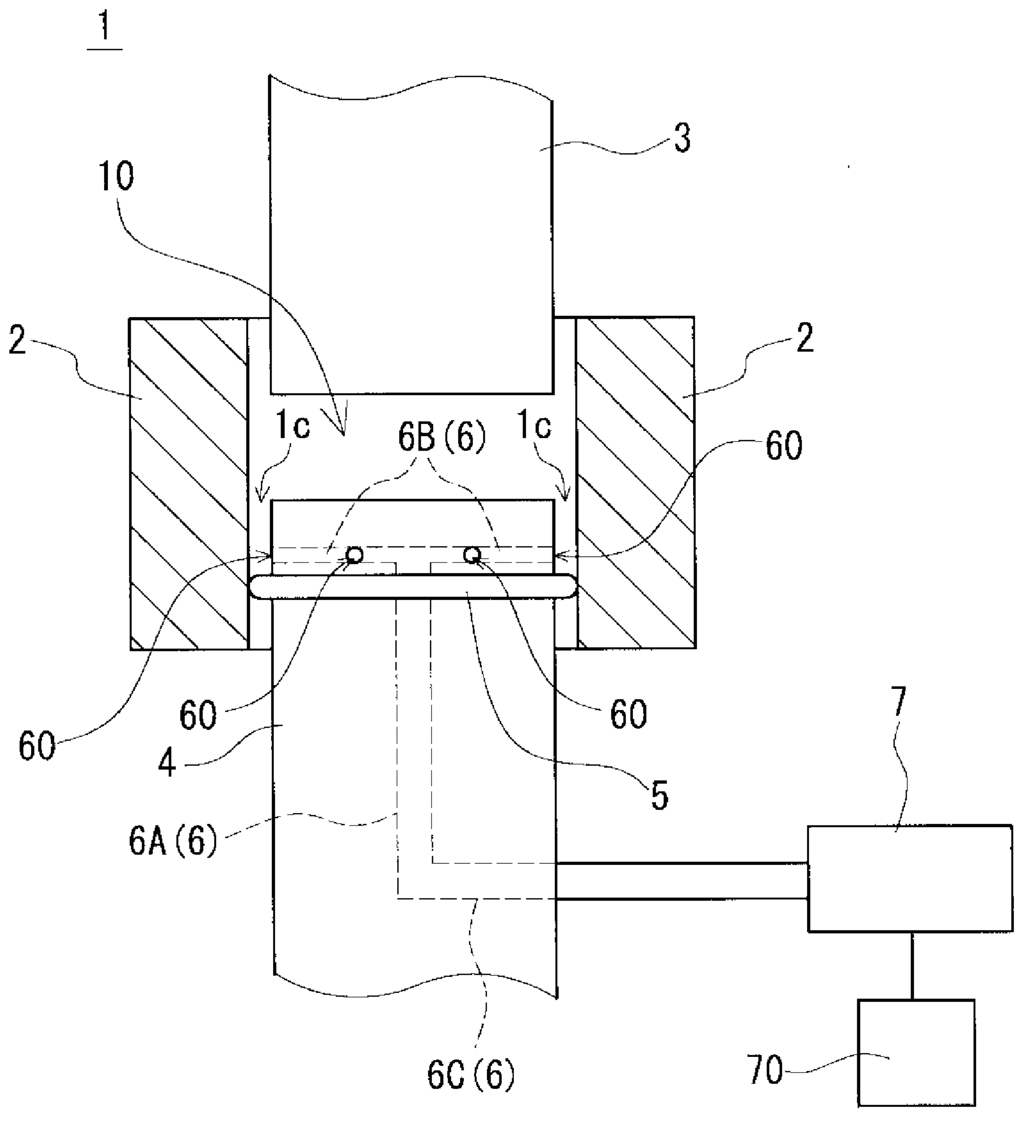
FIG. 1 is a schematic view of a powder compaction mold according to a first embodiment.

In the configuration in PTL 1, the powder is compressed between the upper and lower punches to expel gas from the powder, and the gas is discharged to the outside through the vent cut. Thus, if the punch that compresses the powder is moved at a higher speed than in conventional processes in order to improve the productivity of the powder compact, the powder is compressed before gas is sufficiently discharged from the powder, which may result in gas remaining inside the powder compact. Furthermore, as gas is discharged, the powder may also be simultaneously discharged, which may cause, for example, decreased density and dimensional variations near the vent cut. If gas remains inside the powder compact, it is possible, for example, that the powder compact does not have the desired quality or ruptures under the internal pressure of the residual gas, which decreases the yield of the powder compact. The variations in density and dimensions also have an adverse effect on the product function.

Accordingly, an object of the present disclosure is to provide a powder compaction mold that allows a powder compact to be manufactured with high productivity. Another object of the present disclosure is to provide a method, for manufacturing a powder compact, that allows a powder compact to be manufactured with high productivity.

Advantageous Effects of Disclosure

The powder compaction mold according to the present disclosure allows a powder compact to be manufactured with high productivity without being affected by gas contained in the powder.

The method for manufacturing a powder compact according to the present disclosure allows a powder compact to be manufactured with high productivity.

DESCRIPTION OF EMBODIMENTS OF INVENTION

First, embodiments of the present invention will be sequentially described.

(1) A powder compaction mold according to an embodiment is a powder compaction mold that includes a die and upper and lower punches configured to fit into the die and that is configured to compress a powder between the upper and lower punches to manufacture a powder compact, wherein, of the members forming the powder compaction mold, at least one of two members in sliding contact with each other has therein a vent passage through which gas is vented from a filling space for the powder surrounded by the die and the lower punch to an outside of the powder compaction mold, and wherein the vent passage has a gas intake port that is open to a clearance section formed between the two members and connecting to the filling space.

Here, the two members in sliding contact may be the die and the upper punch or may be the die and the lower punch. That is, the vent passage may be provided in the die or may be provided in the upper or lower punch. If a core rod is disposed in the upper or lower punch, the core rod and the upper or lower punch may be regarded as the above two members. In this case, the vent passage may be provided in the upper or lower punch or may be provided in the core rod. The vent passage may be formed at an appropriate position depending on the shape of the powder compact to be fabricated and the structure of the powder compaction mold.

This powder compaction mold allows gas in the powder charged into the filling space to be forcedly discharged to the outside through the vent passage via the clearance section. Thus, the powder compact manufactured using this powder compaction mold contains a smaller amount of residual gas than a powder compact manufactured using a conventional powder compaction mold. The smaller amount of residual gas in the powder compact stabilizes the quality of the powder compact and reduces the likelihood of a failure due to rupture under the internal pressure of gas contained in the powder compact after compression. This improves the quality of the powder compact and also improves the productivity thereof.

In addition, if press compaction is performed while gas in the powder is being forcedly discharged to the outside, the amount of residual gas in the powder compact does not tend to increase even if the moving speed of the upper or lower punch that compresses the powder is increased. That is, an increase in the moving speed of the punch results in a corresponding increase in the production speed of the powder compact.

(2) One form of the powder compaction mold according to the embodiment may be a form in which the vent passage is formed in the upper punch.

It is easier to form the vent passage in the upper punch than in the die. If the vent passage is to be formed in the die by processing, the vent passage is formed radially outward from the through-hole in the die. That is, the through-hole in the die serves as a workspace for forming the vent passage; thus, it is very difficult to perform the procedure of forming the vent passage. In contrast, if the vent passage is to be formed in the upper punch, the vent passage is formed radially inward from the peripheral surface of the punch; thus, it is easy to form the vent passage in the upper punch.

(3) One form of the powder compaction mold according to the embodiment may be a form in which the vent passage is formed in the lower punch.

During the filling of the filling space with the powder, air contained in the powder may form an air pocket in the powder charged into the filling space, thus decreasing the packing density of the powder. In particular, if the filling space is filled with a powder of fine particles, an air pocket tends to form in the powder because of its poor flowability, thus making it difficult to increase the packing density. Accordingly, to manufacture a powder compact having a predetermined density or more, the size of the filling space needs to be increased (typically, a larger distance is provided between the top surface of the die and the end surface of the lower punch during powder feeding) so that the filling space can be filled with a sufficient amount of powder. As the filling space for the powder becomes larger, not only does the powder compaction mold become larger, but the moving distance of the punches during the compression of the powder and the moving distance of the die and the punches relative to each other during the removal of the powder compact from the powder compaction mold also become larger. As the moving distance of the members such as the punches becomes larger, the compaction time becomes correspondingly longer. This causes the following problems: the productivity of the powder compact decreases, the powder compact is easily damaged during removal, and the powder compaction mold wears easily.

In view of the problems described above, the configuration in which the vent passage is formed in the lower punch allows gas in the powder to be discharged during the filling of the space surrounded by the die and the lower punch with the powder. This allows the packing density of the powder in the filling space to be increased without increasing the size of the filling space. That is, the configuration in which the vent passage is formed in the lower punch avoids the problems that arise if the size of the filling space is increased.

(4) One form of the powder compaction mold according to the embodiment may be a form in which the vent passage is formed in the die.

If the vent passage is provided in the upper or lower punch, a decrease in the strength thereof may be of concern. In this case, it is preferred to form the vent passage in the die. It should be understood that the vent passage may be provided in both the punches and the die.

(5) One form of the powder compaction mold according to the embodiment may be a form in which at least one of the upper and lower punches is composed of a plurality of punch segments, and the vent passage is formed in at least one of the punch segments.

If the upper punch (lower punch) is composed of a plurality of punch segments, a powder compact having a complicated shape can be manufactured. In addition, if the vent passage is formed in a punch segment, the vent passage provides the same advantageous effect as a vent passage provided in a unitary upper punch (lower punch).

(6) One form of the powder compaction mold according to the embodiment may be a form in which the powder compaction mold further includes a core rod, and the vent passage is formed in the core rod.

It is easy to form the vent passage in a pillar-like core rod. In addition, a decrease in the strength of the core rod due to the formation of the vent passage is often of little concern since, unlike the upper and lower punches, the core rod is not a member that directly applies pressure to the powder.

(7) One form of the powder compaction mold according to the embodiment may be a form in which if the clearance section is divided into, in a direction along the sliding contact between the two members, a first region on the filling space side, a second region including the intake port, and a third region other than these regions, the powder compaction mold has a wider clearance in at least a portion of the second region near the intake port than in the first and third regions.

Since the clearance section between the two members in sliding contact is very narrow, a pressure loss occurs in the clearance section. If the pressure loss can be reduced, the efficiency of gas venting from the filling space can be improved. Increasing the size of the clearance section between the two members in sliding contact reduces the pressure loss in the clearance section during venting and thus improves the efficiency of gas venting from the filling space; however, the powder would tend to leak from the filling space. In contrast, as shown in the above configuration, if the second region including the intake port is wider than the first and third regions, the leakage of the powder from the filling space can be reduced while the efficiency of gas venting from the filling space is improved.

(8) One form of the powder compaction mold according to the embodiment may be a form in which the clearance in the third region is narrower than the clearance in the first region.

If the clearance in the third region is sufficiently small, little air is taken into the intake port from the lower side of the intake port as air is taken into the intake port. Thus, air can be efficiently vented from the filling space. For example, the clearance in the third region may be about 1 mm or less smaller than the clearance in the first region.

(9) One form of the powder compaction mold according to the embodiment may be a form in which the clearance in the second region varies in the direction along the sliding contact between the two members.

Figure 8:
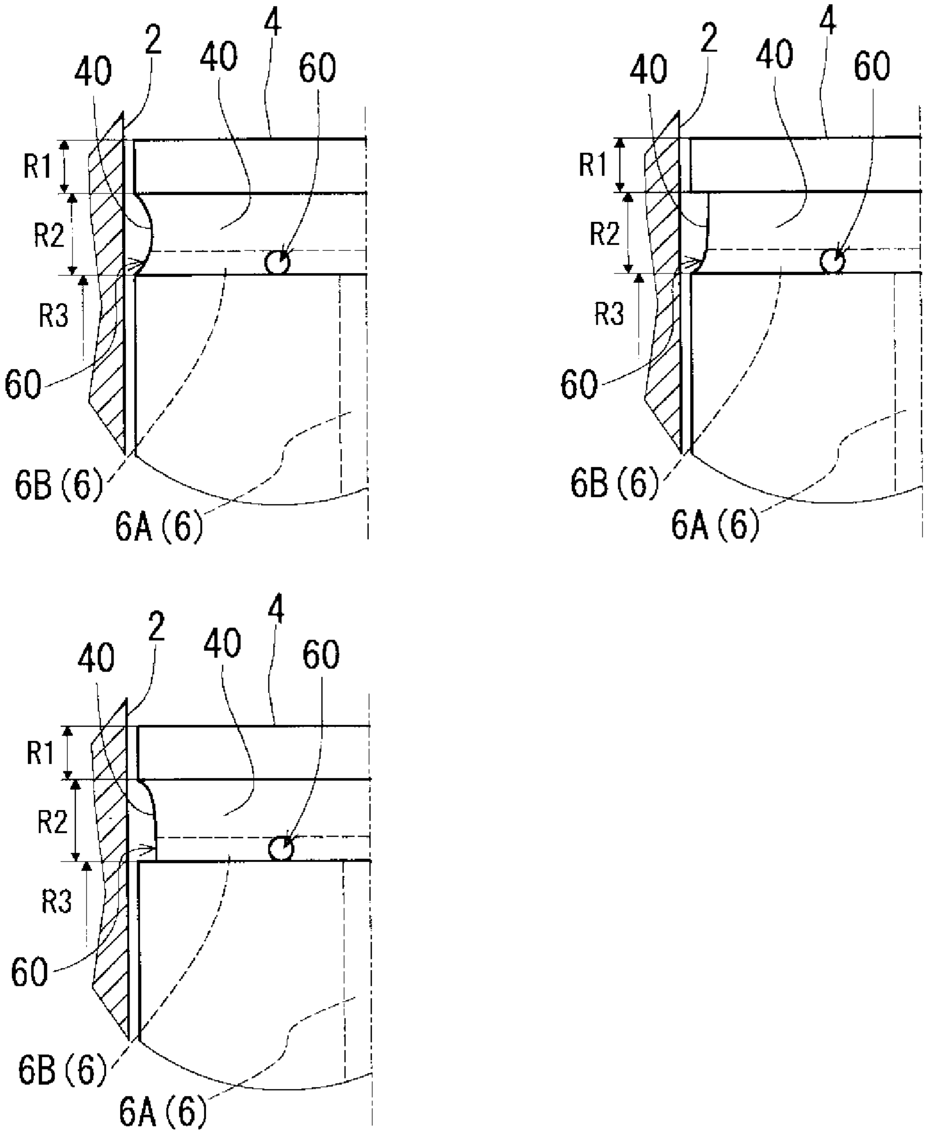
FIG. 8 shows schematic views of powder compaction molds according to a second modification.

Typical examples of such forms include the configurations shown in FIG. 8. Such configurations further improve the efficiency of gas venting from the filling space while reducing the leakage of the powder from the filling space.

(10) One form of the powder compaction mold according to the embodiment may be a form in which the powder compaction mold further includes a seal member disposed in the clearance section on a side of the intake port facing away from the filling space.

If the seal member is provided, no air is taken into the intake port from the lower side of the seal member (the side facing away from the filling space) as air is taken into the intake port. Thus, air can be efficiently vented from the filling space.

(11) One form of the powder compaction mold according to the embodiment including the seal member may be a form in which the seal member is formed of at least one of nitrile rubber, fluorocarbon rubber, silicone rubber, ethylene-propylene rubber, acrylic rubber, hydrogenated nitrile rubber, mineral oil, and silicone grease.

These materials are readily available and have excellent seal performance.

(12) One form of the powder compaction mold according to the embodiment may be a form in which the vent passage includes an axial passage extending in the direction along the sliding contact between the two members and a radial passage connecting to an end of the axial passage, and an end of the radial passage forms the intake port.

The combination of the axial passage and the radial passage makes it easier to form the vent passage. In addition, this configuration allows a plurality of radial passages to be connected to a single axial passage.

(13) One form of the powder compaction mold having the axial passage and the radial passage may be a form in which the radial passage includes a plurality of radial passages connecting to the axial passage.

If a plurality of radial passages are provided, the efficiency of gas discharge from the powder can be improved. In this case, if the radial passages are distributed in the peripheral direction of the lower punch, for example, if the radial passages are arranged radially, gas can be evenly discharged from the entire powder.

(14) One form of the powder compaction mold according to the embodiment may be a form in which the vent passage is composed of a straight passage, a curved passage, or a combination of a straight line and a curved line.

A straight passage can be easily formed by machining. The vent passage may also include a curved passage depending on the shape of the powder compaction mold. Such a powder compaction mold having a vent passage including a curved passage can be fabricated, for example, using a metal 3D printer.

(15) One form of the powder compaction mold according to the embodiment may be a form in which at least a portion of a cross-sectional shape of the vent passage is circular, oval, triangular, quadrangular, or a polygonal.

A circular shape is suitable as the cross-sectional shape of the vent passage for compression molds since this shape is the easiest to form and has no stress concentration area. The cross-sectional shape of the vent passage, however, need not be circular since there may be situations where an oval, triangular, quadrangular, or polygonal shape is preferred. In addition, the cross-sectional shape of the vent passage may vary somewhere along the vent passage. For example, the cross-sectional shape of the axial passage may be circular, and the cross-sectional shape of the radial passage may be quadrangular.

(16) One form of the powder compaction mold according to the embodiment may be a form in which each member forming the powder compaction mold is formed of carbon steel, alloy tool steel, high-speed steel, or cemented carbide.

The members forming the powder compaction mold include the die, the upper punch, and the lower punch. If the powder compaction mold includes a core rod, the members forming the powder compaction mold also include the core rod. Although all of the members forming the powder compaction mold may be formed of the same material, some members may be formed of a different material from other members. As an example of the latter configuration, the die may be formed of cemented carbide, and the two punches may be formed of high-speed steel.

(17) One form of the powder compaction mold according to the embodiment may be a form in which at least one of the members forming the powder compaction mold has a coating layer of diamond-like carbon, TiN, TiC, TiCN, TiAlN, or CrN.

If a coating layer is formed on a member, the coating layer reduces, for example, damage to the surface of the member and seizure of the powder to the surface of the member. In particular, it is preferred to form a coating layer on the sliding contact surfaces of the two members in sliding contact.

(18) One form of the powder compaction mold according to the embodiment may be a form in which the powder compaction mold further includes:

a suction unit connecting to the vent passage; and a control unit configured to control the suction unit.

If the operation of the suction unit for venting gas from the filling space through the vent passage via the clearance section is controlled with the control unit, gas can be vented at an appropriate timing.

(19) A method for manufacturing a powder compact according to an embodiment is a method for manufacturing a powder compact using a powder compaction mold, wherein the powder compaction mold is the powder compaction mold according to the embodiment, the method including:

a powder filling step of filling the filling space with the powder;

a press compaction step of compressing the powder between the upper and lower punches to obtain the powder compact; and a removal step of moving the die and the lower punch relative to each other to remove the powder compact from the powder compaction mold, wherein gas is vented from the filling space through the vent passage in at least one of the powder filling step, the press compaction step, and the removal step.

If gas is discharged through the vent passage in the powder filling step, the packing density of the powder in the filling space can be improved. This allows a powder compact having a predetermined density or more to be manufactured without increasing the size of the filling space. It should be noted that the discharge of gas in the powder filling step requires the vent passage to be formed in the die or the lower punch.

If gas is discharged through the vent passage in the press compaction step, gas can be sufficiently removed from the powder during the compression of the powder. This allows a powder compact containing a smaller amount of residual gas to be manufactured with high productivity.

If gas is discharged through the vent passage in the removal step, powder entering the clearance section between the die and the lower punch during press compaction can be removed. This reduces the wear of the powder compaction mold due to the powder entering the clearance section and the seizure of the powder to the powder compaction mold.

(20) One form of the method for manufacturing a powder compact according to the embodiment may be a form in which a pressure of 0.05 MPa or less is reached in the filling space in the press compaction step.

This configuration allows a powder compact with high density to be manufactured.

(21) One form of the method for manufacturing a powder compact according to the embodiment may be a form in which the venting is started when the upper punch is inserted into the die and is terminated when the upper punch is withdrawn from the die.

This configuration minimizes the operation of the suction unit for venting gas in the manufacture of a powder compact with high density.

DETAILED DESCRIPTION OF EMBODIMENTS OF INVENTION

Embodiments of the present invention will now be described in detail. A powder compaction mold according to an embodiment will first be described, and a method for manufacturing a powder compact using the powder compaction mold will then be described. The invention, however, is not limited to these examples, but is defined by the claims, and all changes that come within the meaning and range of equivalency of the claims are intended to be embraced therein.

First Embodiment

Powder Compaction Mold

A powder compaction mold 1 shown in FIG. 1 includes a die 2 and upper and lower punches 3 and 4 configured to fit into the die 2. A major difference between this powder compaction mold 1 and conventional powder compaction molds is that the powder compaction mold 1 has a vent passage 6 through which gas is vented from a filling space 10 for powder surrounded by the die 2 and the lower punch 4 to the outside of the powder compaction mold 1. The individual components of the powder compaction mold 1 will now be described.

Die

The die 2 is a member having a through-hole. The overall shape of the through-hole is determined depending on the shape of the powder compact to be fabricated. For example, the profile of the inner peripheral surface of the through-hole perpendicular to the axial direction may be oval, including perfect circles, or may be polygonal. Any profile may be employed, since powder compaction is characterized in that an article having a complicated shape including a combination of straight and curved lines can be fabricated. In this example, the profile of the inner peripheral surface of the through-hole is substantially quadrangular.

Upper and Lower Punches

The upper and lower punches 3 and 4 are members configured to fit into the through-hole in the die 2 described above to compress a powder in the die 2. The punches 3 and 4 may have any shape that conforms to the shape of the through-hole in the die 2 and that allows the powder placed inside the die 2 to be compressed at a predetermined pressure. In this example, the cross-sectional shape of the punches 3 and 4 perpendicular to the axial direction is substantially quadrangular.

The punches 3 and 4 are slightly smaller than the through-hole in the die 2. That is, a clearance section 1*c* is formed between the peripheral surfaces (surfaces different from the compression surfaces that compress the powder) of the punches 3 and 4 and the inner peripheral surface of the through-hole in the die 2. This is because the punches 3 and 4 need to slide relative to the through-hole in the die 2 during the fitting of the punches 3 and 4 into the die 2 and during press compaction. For example, the size of the clearance section 1*c* is preferably from 0.003 mm to 0.1 mm, more preferably from 0.01 mm to 0.05 mm. The clearance section 1*c* connects to the filling space 10 for the powder surrounded by the die 2 and the lower punch 4.

Vent Passage

The vent passage 6 is provided in at least one of two members in sliding contact. The vent passage 6 is a gas passage through which gas is vented from the filling space 10 to the outside of the powder compaction mold 1 and has gas intake ports 60 that are open to the clearance section 1*c* formed between the two members in sliding contact. In this example, the vent passage 6 is formed in the lower punch 4, which is in sliding contact with the die 2. It should be understood that, as shown in other embodiments described later, the vent passage 6 may be formed in the die 2 or may be formed in the upper punch 3. If the powder compaction mold 1 includes a core rod, the vent passage 6 may be formed in the core rod.

Figure 2:
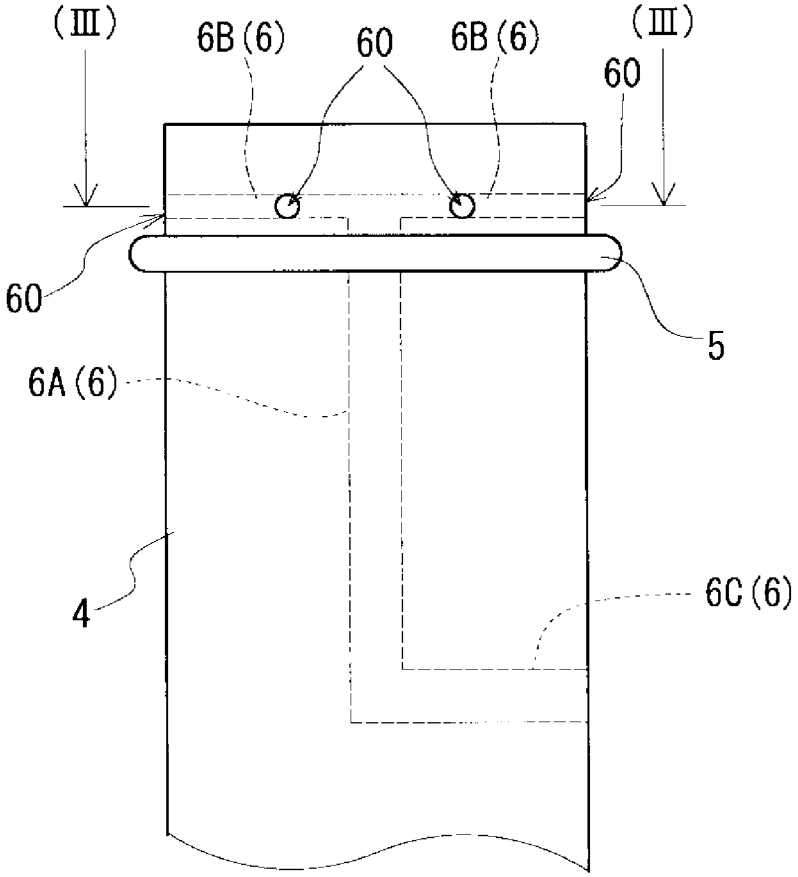
FIG. 2 is a schematic view of a lower punch of the powder compaction mold according to the first embodiment.

The vent passage 6 is composed of an axial passage 6A formed in the lower punch 4 (here, in the center of the lower punch 4), a plurality of radial passages 6B connecting to an end of the axial passage 6A on the vertically upper side (on the side facing the upper punch 3), and an external connection passage 6C connecting to the axial passage 6A on the vertically lower side (see also FIG. 2). The intake ports 60 of the vent passage 6, which are open ends of the radial passages 6B, are open to the clearance section 1*c* between the lower punch 4 and the die 2.

In addition to the vent passage 6, the configuration according to this example includes a seal member 5 disposed on the peripheral surface of the lower punch 4 on the vertically lower side of the intake ports 60 to divide the clearance section 1*c* into vertically upper and lower regions. In addition, a suction unit 7, such as a vacuum pump, connects to the external connection passage 6C. The suction unit 7 is controlled by a control unit 70 composed of components such as a computer. Thus, the suction unit 7 can be operated to take gas from the filling space 10 through the clearance section 1*c* into the vent passage 6. The gas taken into the vent passage 6 is discharged to the outside of the powder compaction mold 1. Here, gas is vented through the clearance section 1*c* between the two members in sliding contact (here, between the die 2 and the lower punch 4), and the intake ports 60 are not open to the filling space 10, which prevents a powder 8 in the filling space 10 from being discharged to the outside during venting. The seal member 5 may be omitted if the distance of the clearance section 1*c* (clearance) is sufficiently small. The omission of the seal member 5 eliminates the need to provide and replace the seal member 5, thus improving the productivity, including cost, of the powder compact.

Figure 3:
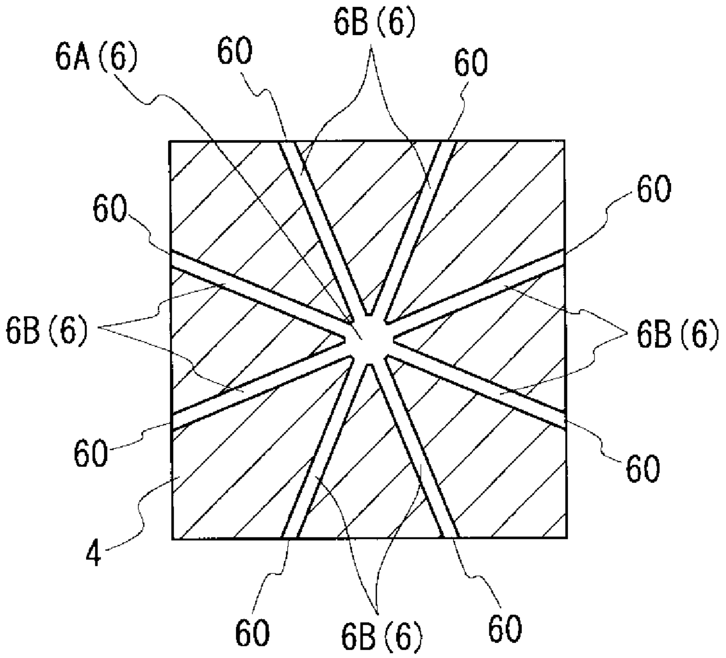
FIG. 3 is a sectional view taken along line III-III in FIG. 2.

In the configuration according to this example, as shown in the sectional view, taken along line III-III, in FIG. 3, a plurality of radial passages 6B are arranged radially about the axial passage 6A. Since a plurality of radial passages 6B are provided, a plurality of intake ports 60 are open to the clearance section 1*c*, thus improving the efficiency of gas venting from the filling space 10 (see FIG. 1). In addition, since a plurality of radial passages 6B are arranged radially, a plurality of intake ports 60 are formed so as to be distributed in the peripheral surface of the lower punch 4, so that gas can be evenly taken into the intake ports 60 from the entire clearance section 1*c*.

As shown in FIG. 1, the intake ports 60 are preferably formed at positions within 20 mm from the compression surface (the surface facing the upper punch 3) of the lower punch 4. On the other hand, the intake ports 60 are preferably formed at positions 1 mm or more away from the compression surface since the strength near the compression surface may decrease if the intake ports 60 are too close to the compression surface. The intake ports 60 may have the shape of an oval, a triangle, a quadrangle, a polygon, or any combination thereof.

If the passages 6A, 6B, and 6C are too thick, the strength of the lower punch 4 would decrease, whereas if the passages 6A, 6B, and 6C are too thin, it would be difficult to take gas into the vent passage 6. For example, the areas of cross-sections of the passages 6A, 6B, and 6C perpendicular to the direction in which the passages 6A, 6B, and 6C extend are 10% or less, preferably from 0.5% to 5%, of the area of a transverse cross-section of the lower punch 4 (the cross-sectional area perpendicular to the axial direction). To alleviate stress concentration on the passages 6A, 6B, and 6C during press compaction, it is preferred that the passages 6A, 6B, and 6C have circular cross-sections.

As another component associated with the vent passage 6, a filter for removing powder (not shown) is preferably provided between the external connection passage 6C and the suction unit 7. During suction with the suction unit 7, small amounts of powder and other substances with low specific gravity, such as lubricants, are taken together with the gas into the vent passage 6. If the powder is taken into the suction unit 7, the suction unit 7 may fail. If the filter is provided upstream of the suction unit 7, failure of the suction unit 7 can be avoided.

Method for Manufacturing Powder Compact

Figure 4:
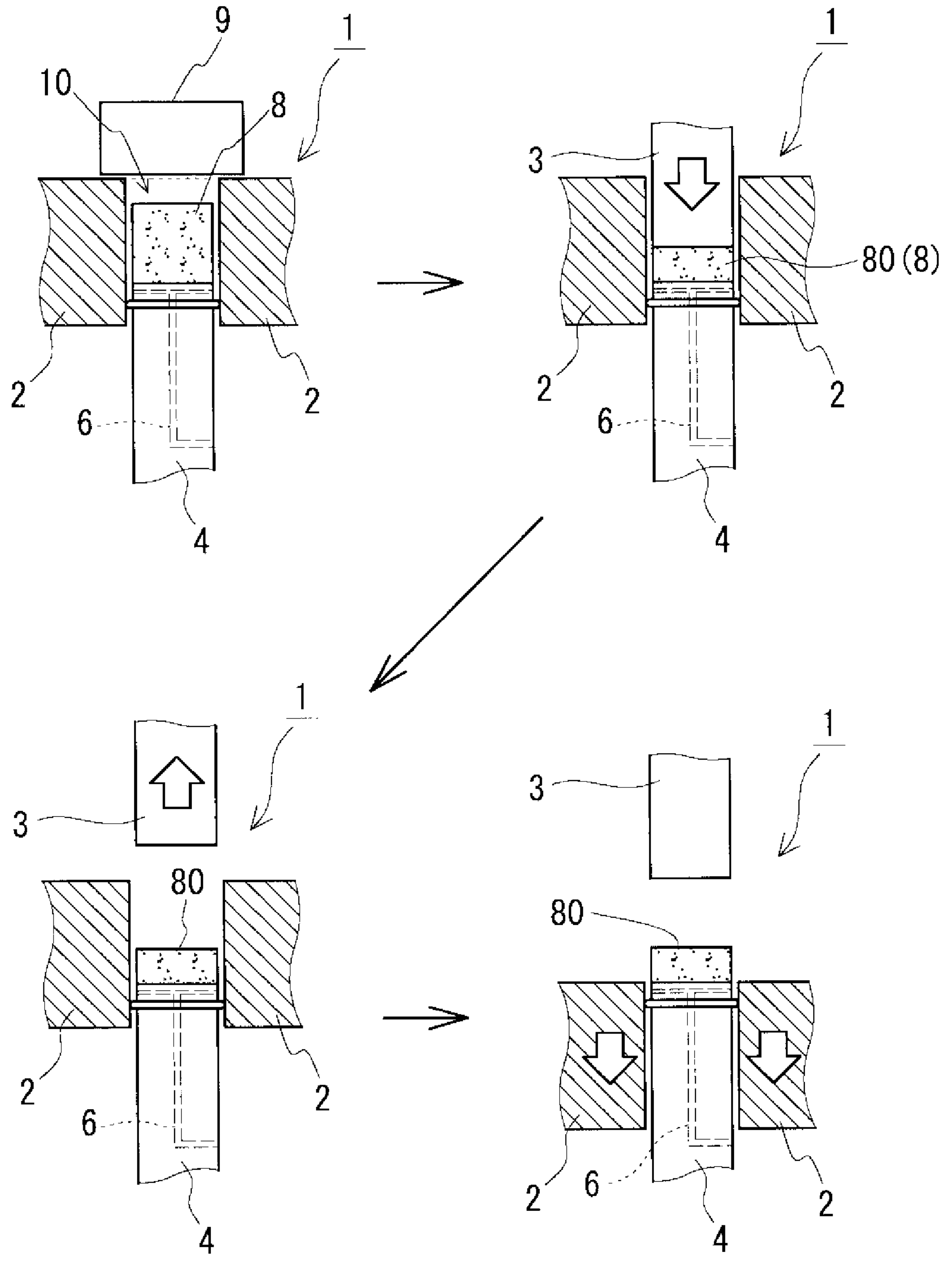
FIG. 4 shows illustrations of the steps of a method for manufacturing a powder compact according to an embodiment.

A method for manufacturing a powder compact using the powder compaction mold 1 described with reference to FIGS. 1 to 3 includes a powder filling step, a press compaction step, and a removal step. In this method for manufacturing a powder compact, gas is vented from the filling space 10 in at least one of these steps. The individual steps will now be described with reference to FIG. 4. FIG. 4 shows illustrations of the steps of the method for manufacturing a powder compact in chronological order.

Powder Filling Step

As shown in the upper left of FIG. 4, the powder filling step involves filling the filling space 10 formed between the die 2 and the lower punch 4 with the powder 8. The filling space 10 is filled with the powder 8 from above the filling space 10 by a powder feed unit 9. In the figure, the filling space 10 is not fully filled with the powder 8 since filling is underway in this figure. After filling is complete, the filling space 10 is fully filled with the powder 8.

The filling space 10 may be filled with any powder. For example, if the powder compact is used to manufacture a sintered part, the filling space 10 is filled with a pure iron powder or a composite powder such as an Fe—Cu—C-based powder, an Fe—Ni—Mo—Cu—C-based powder, an Fe—Mo—Cu—C-based powder, an Fe—Mo—Cr—C-based powder, or an Fe—Mo—C-based powder. The powder may be either a mixed powder prepared by separately mixing stock powders or a prealloyed powder prepared by prealloying elements other than C. If a magnetic powder core is manufactured, the filling space 10 is filled with a pure iron powder or a soft magnetic powder such as an Fe—Si—Al-based alloy, an Fe—Si-based alloy, an Fe—Al-based alloy, or an Fe—Ni-based alloy. The powder may be mixed with a lubricant and a ceramic filler. The particles forming the powder may be coated with an insulating film.

In this powder filling step, gas may be vented from the filling space 10 through the vent passage 6. That is, the filling space 10 may be filled with the powder 8 while gas is being vented from the filling space 10. This allows gas contained in the powder 8 charged into the filling space 10 to be discharged through the vent passage 6, thus increasing the packing density of the powder 8 in the filling space 10. The increased packing density of the powder 8 reduces the depth of the filling space 10 required to charge the same amount of powder 8 as in conventional processes. The reduced depth of the filling space 10 reduces the moving distance of the upper punch 3 in the press compaction step and the moving distance of the upper punch 3 and the die 2 in the removal step, as described later. This shortens the time required to manufacture the powder compact 80 and improves the productivity of the powder compact 80. The reduced moving distance of the punches 3 and 4 and the die 2 also reduces the wear of the punches 3 and 4 and the die 2. The reduced sliding distance during the removal of the powder compact 80 from the mold is also effective in reducing seizure to the powder compaction mold 1.

The optimum gas vent rate is selected depending on factors such as the average particle size of the powder 8 and the size of the clearance section 1*c*. For example, the suction unit 7 (see FIG. 1) may be operated such that the flow rate of gas through the vent passage 6 for gas venting without filling the filling space 10 with the powder 8 is 1 m/sec or more, preferably 3 m/sec or more.

Press Compaction Step

As shown in the upper right of FIG. 4, the press compaction step involves compressing the powder 8 between the upper and lower punches 3 and 4 by moving the upper punch 3 vertically downward and also moving the die 2 vertically downward as if the powder 8 were evenly pressed from above and below. As a result, the powder compact 80 is formed between the two punches 3 and 4.

The powder 8 may be compressed at an appropriate pressure (compaction pressure) selected depending on the type of powder 8. For example, the preferred compaction pressure is from 490 MPa to 1,470 MPa for powders for sintered parts such as variable valve mechanisms and oil pumps and soft magnetic powders for magnetic parts such as motors and reactor cores.

In this press compaction step, gas may be vented from the filling space 10 through the vent passage 6. That is, the powder 8 may be compressed while gas present in the powder 8 in the filling space 10 is being taken into the vent passage 6. This allows gas to be sufficiently removed from the powder 8 during the compression of the powder 8, so that a powder compact 80 containing a smaller amount of residual gas can be manufactured. The smaller amount of residual gas in the powder compact 80 stabilizes the quality of the powder compact 80 and reduces the likelihood of the powder compact deforming or rupturing under the internal pressure of the compressed gas during its removal from the mold, thus improving the productivity of the powder compact 80.

Although the gas vent rate in the press compaction step may be similar to the gas vent rate in the powder filling step, the above advantageous effect is not affected even if the vent rate decreases spontaneously as the pressure in the filling space 10 decreases. The suction unit 7 is preferably operated such that a pressure of 0.05 MPa or less is finally reached in the filling space 10.

Removal Step

As shown in the lower left of FIG. 4, the removal step involves detaching the upper punch 3 from the die 2 and, as shown in the lower right of FIG. 4, moving the die 2 vertically downward. As a result, the powder compact 80 is exposed in the top surface of the die 2 and can be removed from the powder compaction mold 1.

In this removal step, gas may be vented from the filling space 10 through the vent passage 6. That is, gas is taken into the vent passage 6 while the upper punch 3 is moved vertically upward or the die 2 is moved vertically downward. This allows powder entering the clearance section 1*c* between the die 2 and the lower punch 4 during press compaction, that is, powder deposited on the peripheral surface of the lower punch 4 or the inner peripheral surface of the through-hole in the die 2, to be removed. This reduces the wear of the powder compaction mold 1 due to the powder and the seizure of the powder to the powder compaction mold 1, thus improving the life of the powder compaction mold 1. An improvement in mold life can be considered as an improvement in the productivity of the powder compact 80 in a broad sense.

The gas vent rate in the removal step may be similar to the gas vent rate in the powder filling step.

Here, the timing of gas venting may be determined depending on the movement of the members of the powder compaction mold 1. For example, the control unit 70 may control the ON/OFF state of the suction unit 7 based on information from a sensor (not shown) that detects the movement of the upper punch 3. As a typical example, control may be performed such that the suction unit 7 is activated to start venting when the sensor detects the timing at which the upper punch 3 is inserted into the die 2 and is stopped to terminate venting when the sensor detects the timing at which the upper punch 3 is withdrawn from the die 2 after the compression of the powder 8. This provides the advantage of minimizing the operating time of the suction unit 7.

Second Embodiment

In a second embodiment, a powder compaction mold 1 that differs in the shape of the clearance section 1*c* from the powder compaction mold 1 according to the first embodiment will be described with reference to FIGS. 5 to 7. In this example, the lower punch 4 differs in shape from the lower punch 4 in the first embodiment (see FIG. 1) in order to form a clearance section 1*c* that differs in shape from the clearance section 1*c* in the first embodiment. The powder compaction mold 1 according to the second embodiment has the same configuration as the powder compaction mold 1 according to the first embodiment except for the lower punch 4.

Figure 5:
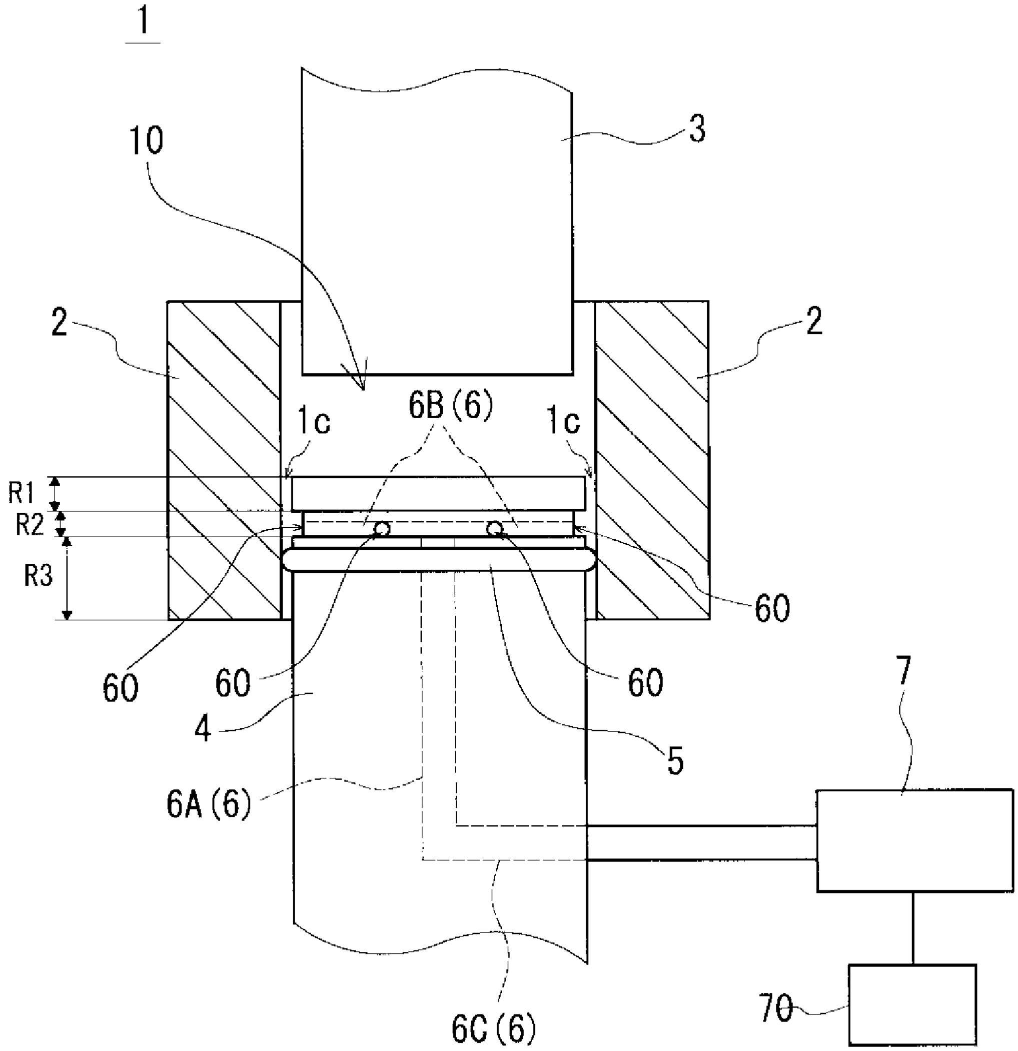
FIG. 5 is a schematic view of a powder compaction mold according to a second embodiment.

In the powder compaction mold 1 according to this example shown in FIG. 5, the clearance section 1*c* is regarded as being divided into, in the direction along the sliding contact between the two members (here, the die 2 and the lower punch 4), a first region R1, a second region R2, and a third region R3:

- First region R1 . . . A region on the filling space 10 side. Here, a region having a predetermined length from the compression surface of the lower punch 4.
- Second region R2 . . . A region including the intake ports 60. Here, a region from the lower end of the first region R1 to the lower ends of the intake ports 60.
- Third region R3 . . . A region other than the first and second regions R1 and R2. Here, a region below the second region R2.

If the clearance section 1*c* is divided into these three regions, the powder compaction mold 1 according to this example has a wider clearance in at least a portion of the second region R2 near the intake ports 60 than in the first and third regions R1 and R3. This configuration reduces pressure loss in the clearance section 1*c* during venting, thus improving the efficiency of gas venting from the filling space 10. In addition, the smaller clearance in the first region R1 reduces leakage of the powder from the filling space 10 to the clearance section 1*c*.

To form the clearance section 1*c* having the above shape, the lower punch 4 in this example has a recess formed in a portion of the outer peripheral surface thereof. This recess will be described in detail with reference to FIGS. 6 and 7. As shown in FIGS. 6 and 7, a recess 40 in this example is formed by removing the outer peripheral surface of the lower punch 4 over the entire perimeter thereof so as to at least partially include the intake ports 60. That is, the intake ports 60 in this configuration are open in the recess 40. As shown in FIG. 6, the intake ports 60 in this example are open in the recess 40 on the lower side (the side facing away from the compression surface) so that the pressure loss during the venting of gas from the compression surface side into the intake ports 60 can be easily reduced. The intake ports 60 may be open around the center of the recess 40 in the width direction (in the direction from the top to the bottom of the page) or at positions closer to the compression surface, although the pressure loss is reduced to a lesser extent. Even if the intake ports 60 partially overlap the recess 40, its advantageous effect is not significantly affected.

As shown in FIG. 5, the recess 40 forms the second region R2 in the clearance section 1*c*. The width (the length in the direction from the top to the bottom of the page in FIG. 6) and the depth (the length in the direction from the left to the right of the page in FIGS. 6 and 7) of the recess 40 may be appropriately selected. For example, the width of the recess 40 is preferably about 1 to 10 times, more preferably 1.5 to 5 times, the diameter of the intake ports 60. The depth of the recess 40 is preferably selected such that the size of the clearance in the second region R2 of the clearance section 1*c* in FIG. 5 is about 1.5 to 100 times, more preferably 3 to 30 times, the size of the clearance in the first region R1 (third region R3).

The upper end of the recess 40 on the compression surface side (the upper end on the filling space 10 side in FIG. 5) is preferably separated from the compression surface by a distance of 1 mm or more. If the distance from the compression surface is 1 mm or more, the decrease in the strength of the lower punch 4 on the compression surface side due to the formation of the recess 40 can be reduced. A longer distance is also advantageous in terms of cost since a larger number of repair operations can be performed when the compression surface wears, for example, due to sliding through the die 2. This distance is preferably 1 mm or more, more preferably 4 mm or more.

First Modification

Whereas the recess 40 is formed over the entire perimeter of the lower punch 4 in the second embodiment, the recess 40 may be formed only in portions corresponding to the intake ports 60. Specifically, only the portions of the lower punch 4 near the intake ports 60 in FIG. 7 may be removed to form a number of recesses 40 corresponding to the number of intake ports 60. The seal member 5 in FIG. 5 may be omitted if the clearance in the first and third regions R1 and R3 of the clearance section 1*c* is sufficiently small.

Second Modification

In the second embodiment, the clearance in the second region R2 (FIG. 5) including the intake ports 60 is constant in the axial direction of the lower punch 4; however, the clearance in the second region R2 may vary in the axial direction of the lower punch 4, as shown in the upper left, the lower left, and the upper right of FIG. 8.

In the configuration in the upper left of FIG. 8, an arc-shaped recess 40 is formed in the peripheral surface of the lower punch 4 such that the recess 40 is deepest in the center in the width direction (identical to the axial direction of the lower punch 4). Accordingly, in this configuration, the clearance in the second region R2 is wider in the center in the axial direction of the lower punch 4 and becomes gradually narrower toward the first and third regions R1 and R3. The intake ports 60 are located in the inclined surface of the recess 40 on the third region R3 side, and there is a relatively wide clearance around the intake ports 60, so that air can be easily taken into the intake ports 60.

In the configuration in the lower left of FIG. 8, the recess 40 becomes gradually deeper from the first region R1 side toward the third region R3 side. Accordingly, in this configuration, the clearance in the second region R2 is widest on the third region R3 side and becomes gradually narrower toward the first region R1 side. The intake ports 60 are located in the recess 40 on the third region R3 side, and there is a large clearance at the intake ports 60, so that air can be easily taken into the intake ports 60.

In the configuration in the upper right of FIG. 8, the recess 40 becomes gradually deeper from the third region R3 side toward the first region R1 side. Accordingly, in this configuration, the clearance in the second region R2 is narrowest on the third region R3 side and becomes gradually wider toward the first region R1 side. The intake ports 60 are located in the inclined surface of the recess 40 on the third region R3 side. In this configuration, the clearance in the second region R2 is wider on the first region R1 side, so that air moves easily from the filling space into the second region R2, and the intake ports 60 face diagonally upward, so that air can be smoothly vented from the filling space into the vent passage 6.

Third Embodiment

Figure 7:
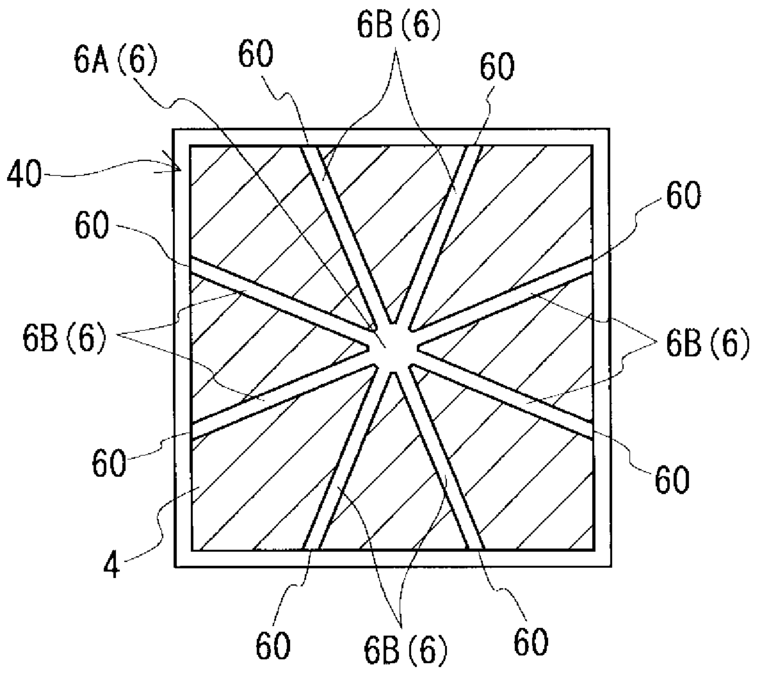
FIG. 7 is a sectional view taken along line VII-VII in FIG. 6.

The configurations in the first and second embodiments, as shown in FIGS. 3 and 7, have two intake ports 60 formed in each of the four peripheral surfaces of the lower punch 4 so that gas can be evenly discharged from the entire filling space 10 shown in FIGS. 1 and 5; however, gas may be deliberately unevenly discharged from the filling space 10.

If the filling space 10 shown in FIGS. 1 and 5 has a complicated shape with a protrusion or a recess, the packing density of the powder in the filling space 10 may become locally lower, which may result in unevenness in the overall quality of the powder compact. To solve this problem, the intake ports 60 are provided near a portion where the packing fraction of the powder tends to be lower than in other portions. For example, if a recess is locally formed in the compression surface of the lower punch 4 on the left side of the page, the packing fraction of the powder may become lower near the recess than in other portions. In this case, if there are only the radial passages 6B provided near the recess on the left side of the figure, the packing density of the powder near the recess (not shown) on the left side of the page can be brought closer to the packing density of the powder in other portions. As a result, a powder compact with uniform overall quality can be manufactured.

Fourth Embodiment

Figure 9:
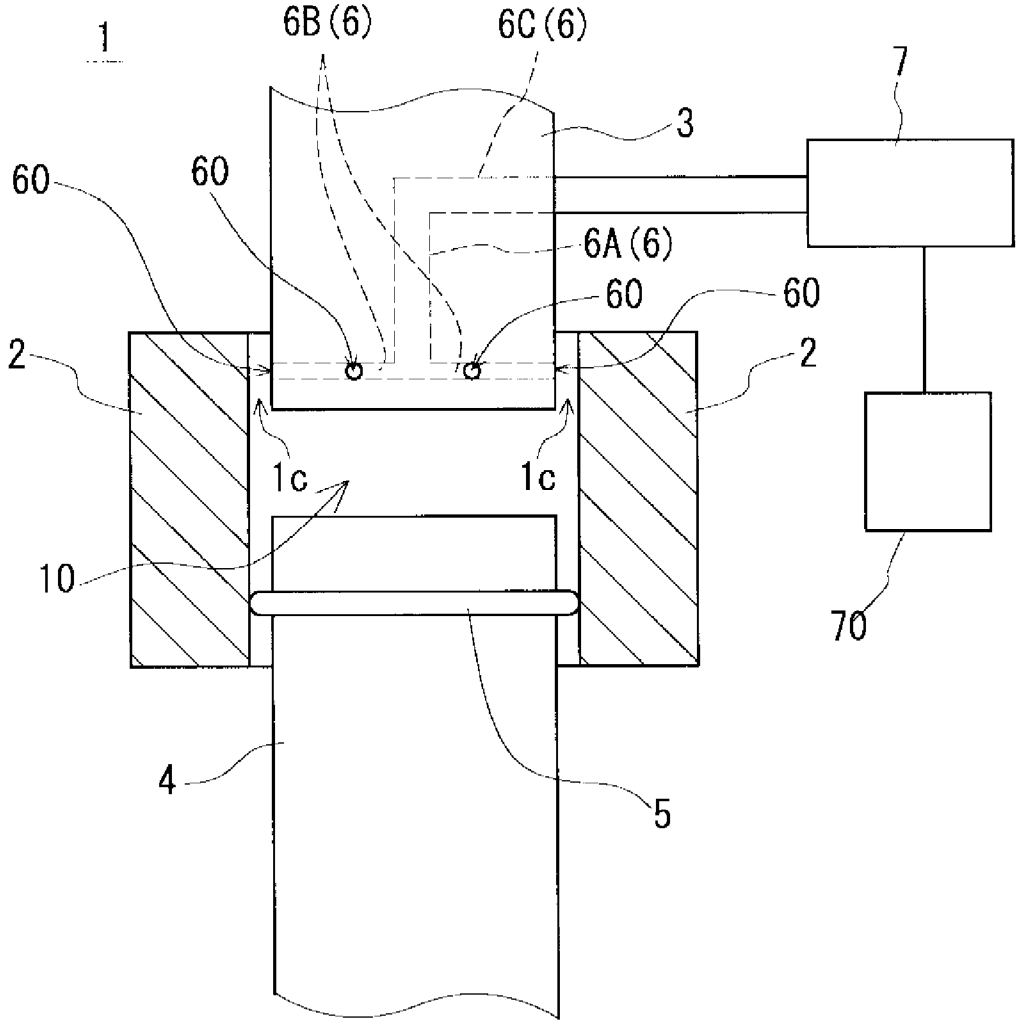
FIG. 9 is a schematic view of a powder compaction mold according to a fourth embodiment.

In a fourth embodiment, a powder compaction mold 1 including an upper punch 3 having a vent passage 6 will be described with reference to FIG. 9.

The vent passage 6 in this example is provided in the upper punch 3. The vent passage 6 in the upper punch 3 may be composed of a combination of an axial passage 6A and radial passages 6B. As in the second embodiment, the recess 40 (see FIGS. 5 and 8) may also be provided in the upper punch 3. With the configuration according to this example, gas can be vented from the filling space 10 during the compression of the powder, thus allowing a powder compact with high density to be manufactured.

Fifth Embodiment

Figure 10:
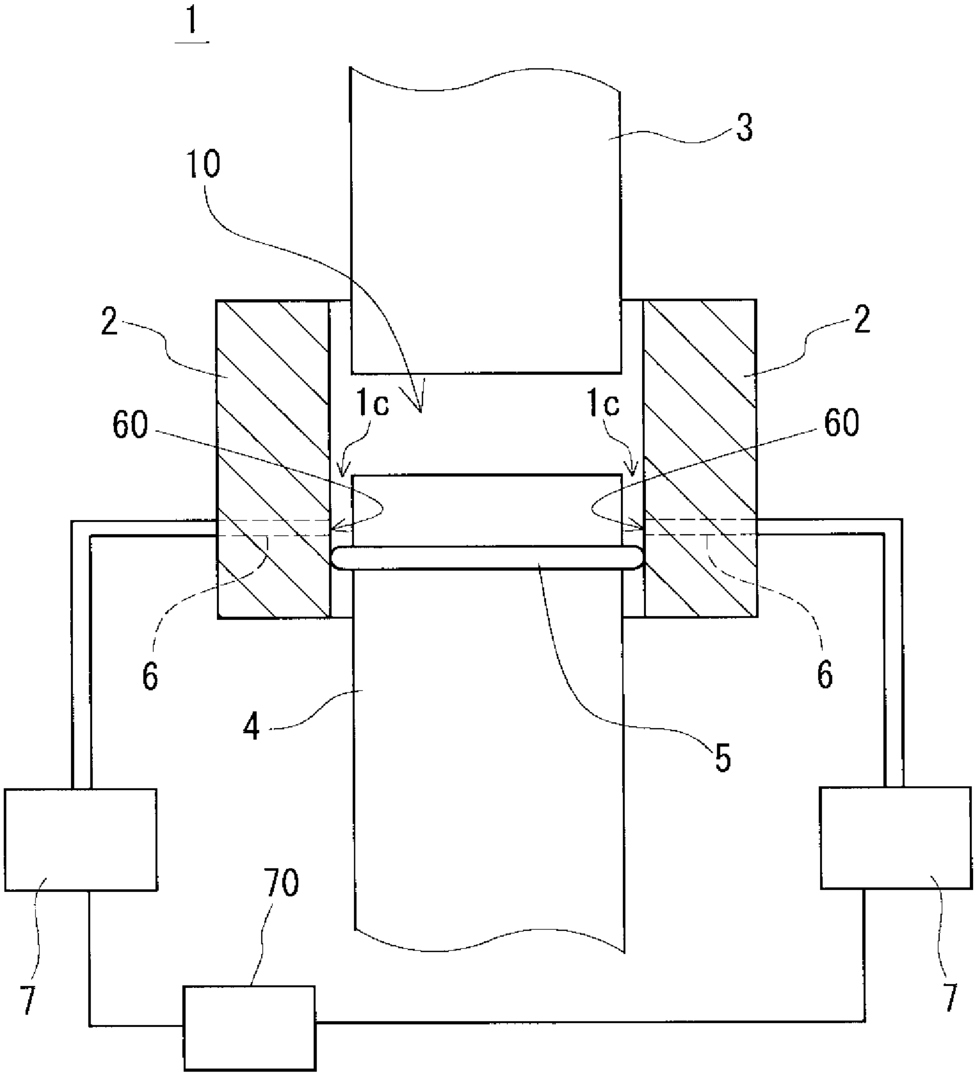
FIG. 10 is a schematic view of a powder compaction mold according to a fifth embodiment.

In a fifth embodiment, a powder compaction mold 1 including a die 2 having vent passages 6 will be described with reference to FIG. 10.

The vent passages 6 in this example are communication holes that are open in the outer and inner peripheral surfaces of the die 2. The plurality of vent passages 6 can be arranged in the peripheral direction of the die 2. The intake ports 60 are open in the region of the inner peripheral surface of the die 2 opposite the outer peripheral surface of the lower punch 4 and are located vertically above the seal member 5. As shown in FIG. 10, the suction unit 7 can be provided for each vent passage 6 to change the amount of gas taken into each vent passage 6. It should be understood that a single suction unit 7 may be used to take gas into some or all of the vent passages 6. With the configuration according to this example, gas can be vented from the filling space 10 during the compression of the powder, thus allowing a powder compact with high density to be manufactured.

Sixth Embodiment

Figure 11:
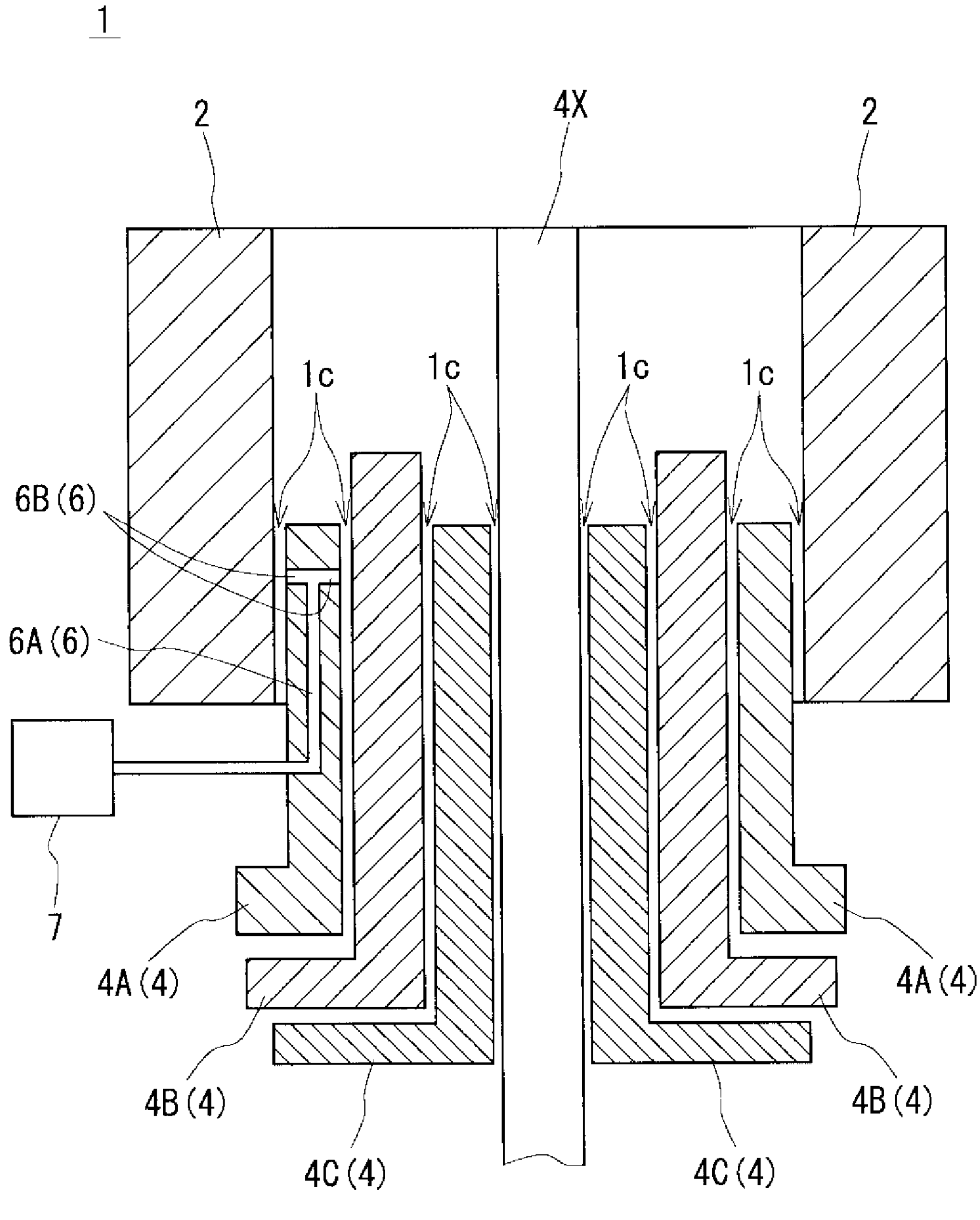
FIG. 11 is a schematic view of a powder compaction mold according to a sixth embodiment.

In a sixth embodiment, a powder compaction mold 1 including a lower punch 4 composed of a plurality of punch segments 4A, 4B, and 4C will be described with reference to FIG. 11. The powder compaction mold 1 according to this example further includes a core rod 4X extending through the center of the lower punch 4. In FIG. 11, the upper punch is not shown. It should be noted that the control unit 70 is not shown in the figures for this example and the subsequent embodiments.

The lower punch 4 of the powder compaction mold 1 in FIG. 11 is composed of the three punch segments 4A, 4B, and 4C, which are arranged coaxially with the core rod 4X. The punch segments 4A, 4B, and 4C, which are formed as hollow members, can be separately moved. This powder compaction mold 1 has clearance sections 1*c* formed between the inner peripheral surface of the die 2 and the outer peripheral surface of the punch segment 4A, between the inner peripheral surface of the punch segment 4A and the outer peripheral surface of the punch segment 4B, between the inner peripheral surface of the punch segment 4B and the outer peripheral surface of the punch segment 4C, and between the inner peripheral surface of the punch segment 4C and the outer peripheral surface of the core rod 4X.

In the powder compaction mold 1 in FIG. 11, the vent passage 6 can be formed in at least one of the three punch segments 4A, 4B, and 4C. In the example shown, the vent passage 6 is formed in the punch segment 4A, which is the radially outermost segment of the lower punch 4. The vent passage 6 is composed of an axial passage 6A, a radial passage 6B extending toward the inner peripheral surface of the die 2, and a radial passage 6B extending toward the outer peripheral surface of the punch segment 4B. That is, in the configuration according to this example, gas is vented through the clearance between the inner peripheral surface of the die 2 and the outer peripheral surface of the punch segment 4A and from the clearance between the inner peripheral surface of the punch segment 4A and the outer peripheral surface of the punch segment 4B.

Seventh Embodiment

Figure 12:
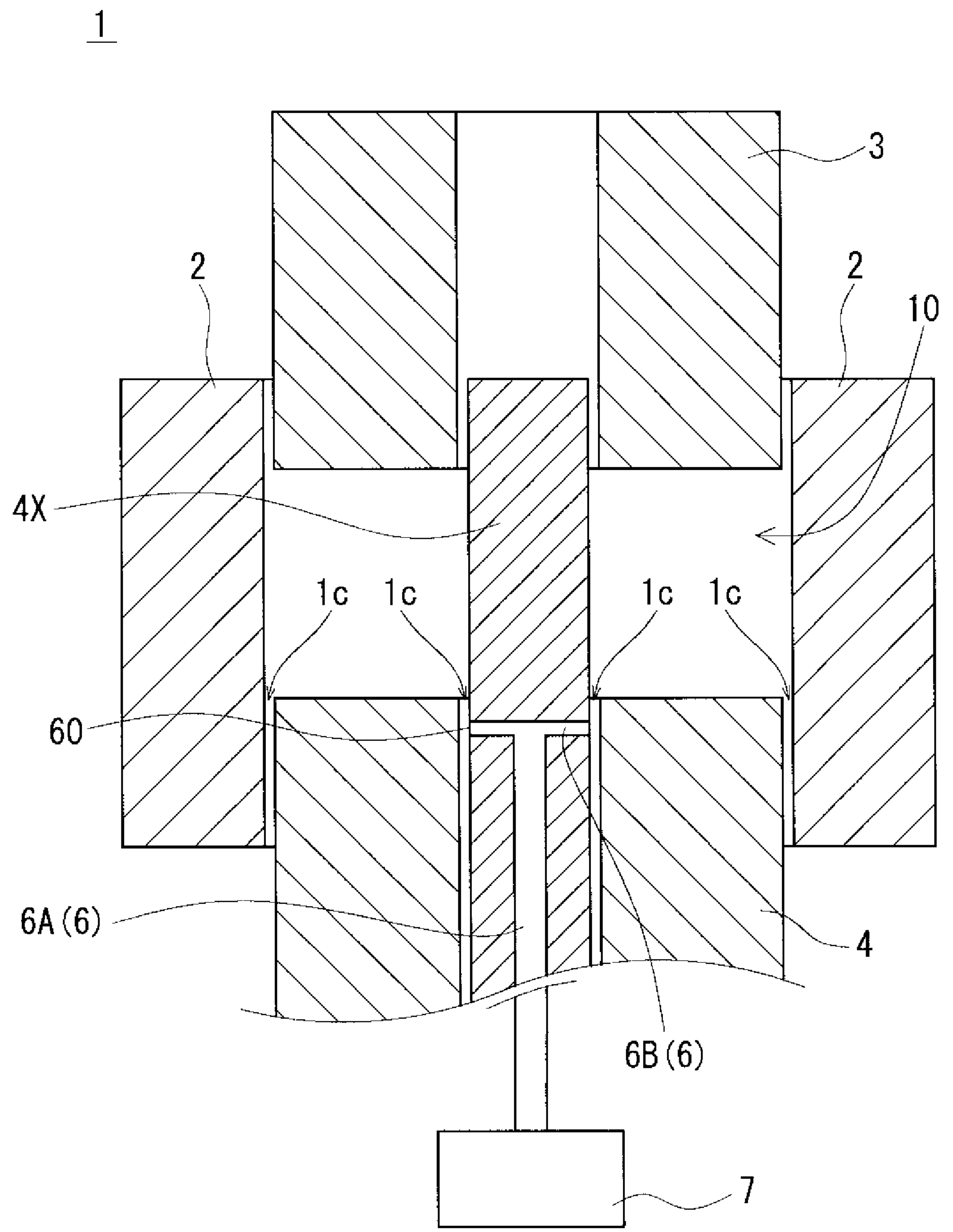
FIG. 12 is a schematic view of a powder compaction mold according to a seventh embodiment.

In a seventh embodiment, a powder compaction mold 1 including a core rod 4X having a vent passage 6 formed therein will be described with reference to FIG. 12.

The vent passage 6 in this example is provided in the core rod 4X and includes an axial passage 6A and radial passages 6B. Intake ports 60 formed by the ends of the radial passages 6B are open to a clearance section 1*c* between the outer peripheral surface of the core rod 4X and the inner peripheral surface of a hollow lower punch 4. In this example, a recess similar to the recess 40 (see FIGS. 5 and 8) described in the second embodiment may be provided in a portion of the core rod 4X including the intake ports 60. With the configuration according to this example, gas can be vented from the filling space 10 during the compression of the powder, thus allowing a powder compact with high density to be manufactured.

In the configuration according to this example, another vent passage 6 may be formed in at least one of the lower punch 4 and the die 2 so that gas can be vented through the clearance section 1*c* between the inner peripheral surface of the die 2 and the outer peripheral surface of the lower punch 4.

Eighth Embodiment

Figure 13:
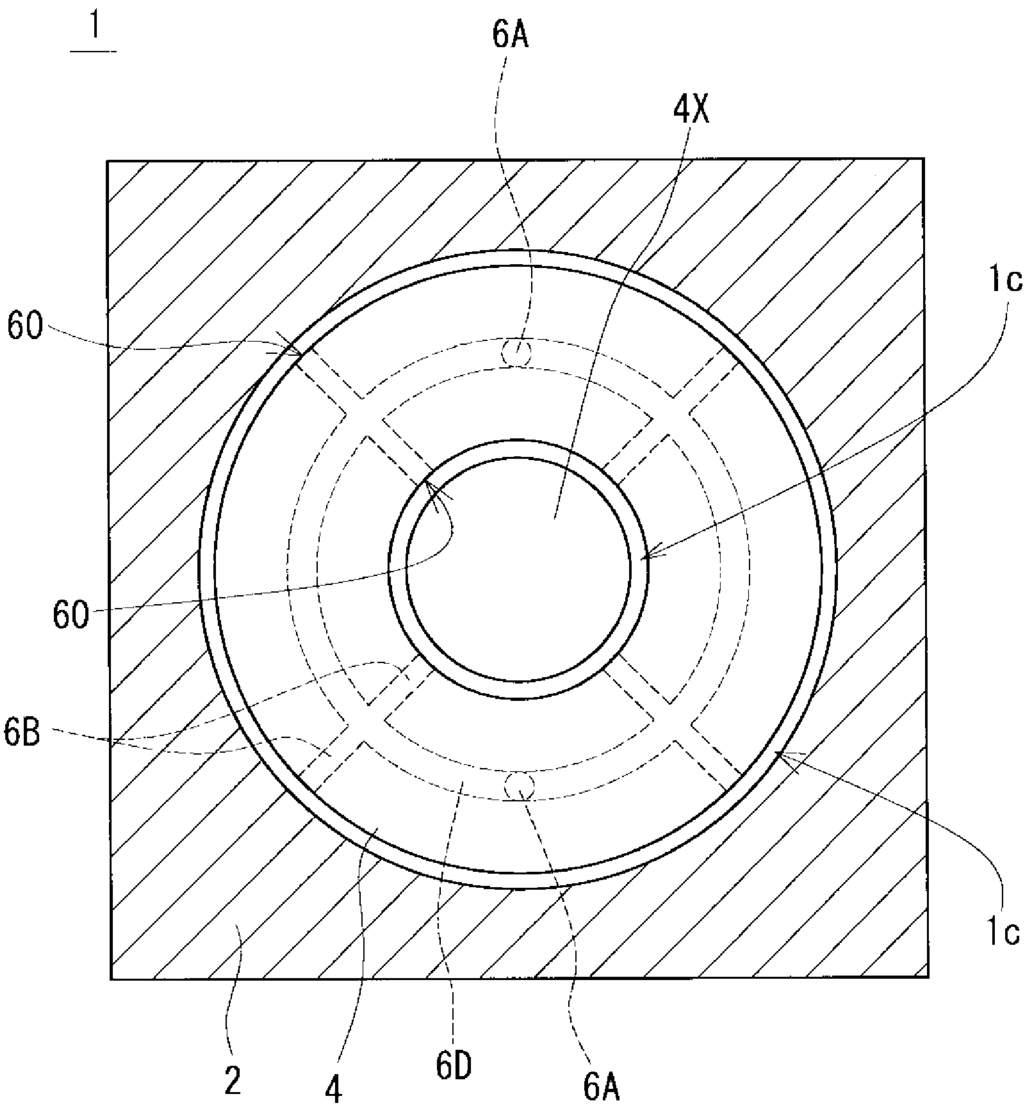
FIG. 13 is a schematic view of a powder compaction mold according to an eighth embodiment.

In an eighth embodiment, an example of a powder compaction mold 1 including a core rod 4X and a lower punch 4 having a vent passage 6 including a curved passage will be described with reference to FIG. 13. FIG. 13 is a view of the powder compaction mold 1 as viewed from vertically above, where the upper punch and the suction unit are not shown.

The vent passage 6 in this example includes an annular curved passage 6D connecting two axial passages 6A extending into the page. In this example, the curved passage 6D is annular and coaxial with the core rod 4X and the lower punch 4. The curved passage 6D has connected thereto four radial passages 6B extending to a clearance section 1*c* between the inner peripheral surface of the die 2 and the outer peripheral surface of the lower punch 4 and four radial passages 6B extending to a clearance section 1*c* between the inner peripheral surface of the lower punch 4 and the outer peripheral surface of the core rod 4X. These radial passages 6B are shifted from the axial passages 6A so that gas can be taken into the individual intake ports 60 by similar suction forces. In this example, with the core rod 4X being the center, the axial passage 6A on the upper side of the page is located at 0°, the axial passage 6A on the lower side is located at 180°, and the radial passages 6B extending inward and the radial passages 6B extending outward are located at 45°, 135°, 225°, and 270°. With the configuration according to this example, gas can be vented from the filling space during the compression of the powder, thus allowing a powder compact with high density to be manufactured.

The curved passage 6D in this example is shaped to extend along the compression surface of the lower punch 4, and the axial passages 6A and the radial passages 6B are evenly arranged in the peripheral direction; thus, the lower punch 4 has no portion where the strength is locally decreased.

The configuration according to this example can also be applied to the punch segments in the sixth embodiment.

Test Example 1

In this test example, the powder compact 80 was actually manufactured using the powder compaction mold 1 shown in the first embodiment, in which reference is made to FIGS. 1 to 3, by press-compacting a pure iron powder having an average particle size of 50 μm and was tested for productivity under the following test conditions. The size of the clearance section 1*c* between the die 2 and the punches 3 and 4 in the powder compaction mold 1 was 25 μm. The distance from the compression surface of the lower punch 4 to the center of the intake ports 60 was 9 mm. The area of the compression surface (i.e., the cross-sectional area of the lower punch 4) was 900 $mm^2$. The passages 6A, 6B, and 6C had circular cross-sections with areas of 7 $mm^2$, 3 $mm^2$, and 7 $mm^2$, respectively. Here, unlike the example shown in FIG. 3, there were four passages 6B in Test Example 1. These passages 6B were arranged at regular intervals in the peripheral direction.

Condition A

In the powder filling step (see the upper left of FIG. 4), the filling space 10 was filled with the powder 8 while gas was being discharged through the vent passage 6. In the press compaction step (see the upper right of FIG. 4), the powder 8 was press-compacted while gas was being discharged through the vent passage 6. In both steps, gas was discharged such that the flow rate of gas through the vent passage 6 for gas venting without filling the filling space 10 with the powder 8 was 3 m/sec or more. The pressing speed (the moving speed of the upper punch 3) was 5 mm/sec, 7 mm/sec, 10 mm/sec, or 12 mm/sec. The seal member 5 used was a silicone rubber O-ring.

Condition B

Condition B were identical to Condition A except that the seal member 5 shown in FIGS. 1 and 2 was not used.

Condition C

Gas was not discharged through the vent passage 6 in the powder filling step or the press compaction step. That is, the powder compact 80 was manufactured by a method similar to conventional methods for manufacturing powder compacts. The pressing speed was 5 mm/sec, 7 mm/sec, 10 mm/sec, or 12 mm/sec.

Test Results

The packing density of the powder 8 for Conditions A, B, and C above were determined. The packing density was calculated from the volume of the filling space and the mass of the finished powder compact 80. The calculation results are shown in Table 1 below.

The powder compact 80 was also visually inspected for rupture as the pressing speed was varied. These results are also shown in Table 1 below.

TABLE 1

| | | Conditions | | |
|---|---|---|---|---|
| | | A | B | C |
| | | Packing density (g/$cm^3$) | | |
| | | 3.80 | 3.70 | 3.64 |
| Pressing speed (mm/sec) | 5 | Compactable | Compactable | Compactable |
| | 7 | Compactable | Compactable | Ruptured |
| | 10 | Compactable | Ruptured | Ruptured |
| | 12 | Ruptured | Ruptured | Ruptured |

As shown in Table 1, the packing density of the powder 8 in the filling space 10 for Condition A, where gas was vented during filling with the powder 8, was 3.80 g/$cm^3$. The packing density of the powder 8 in the filling space 10 for Condition B, where gas was vented during filling with the powder 8 without using the seal member 5, was 3.70 g/$cm^3$. In contrast, the packing density of the powder 8 in the filling space 10 for Condition C, where gas was not vented during filling with the powder 8, was 3.64 g/$cm^3$. These results demonstrate that filling the filling space 10 with the powder 8 while venting gas from the filling space 10 allows a powder compact 80 with high density to be manufactured without increasing the size of the filling space 10. The results also demonstrate that a sufficiently small clearance section between the die 2 and the lower punch 4 allows gas to be sufficiently vented from the filling space 10 without the seal member 5 and thus allows a powder compact 80 with high density to be manufactured. The degree of vacuum reached during powder compaction for Condition A was 0.03 MPa, and the degree of vacuum reached during powder compaction for Condition B was 0.04 MPa.

As shown in Table 1, the powder compact 80 was manufactured without rupture under Condition A, where gas was vented during the press compaction of the powder 8, for pressing speeds of 5 to 10 mm/sec, although the powder compact 80 ruptured for a pressing speed of 12 mm/sec. The powder compact 80 was also manufactured without rupture under Condition B, where gas was vented during the press compaction of the powder 8 without using the seal member 5, for pressing speeds of 5 to 7 mm/sec. In contrast, the powder compact 80 was manufactured without rupture under Condition C, where gas was not vented during the press compaction of the powder 8, only for a pressing speed of 5 mm/sec. These results demonstrate that press-compacting the powder 8 while venting gas from the filling space 10 allows the pressing speed (i.e., the compaction speed) to be increased.

Test Example 2

Figure 6:
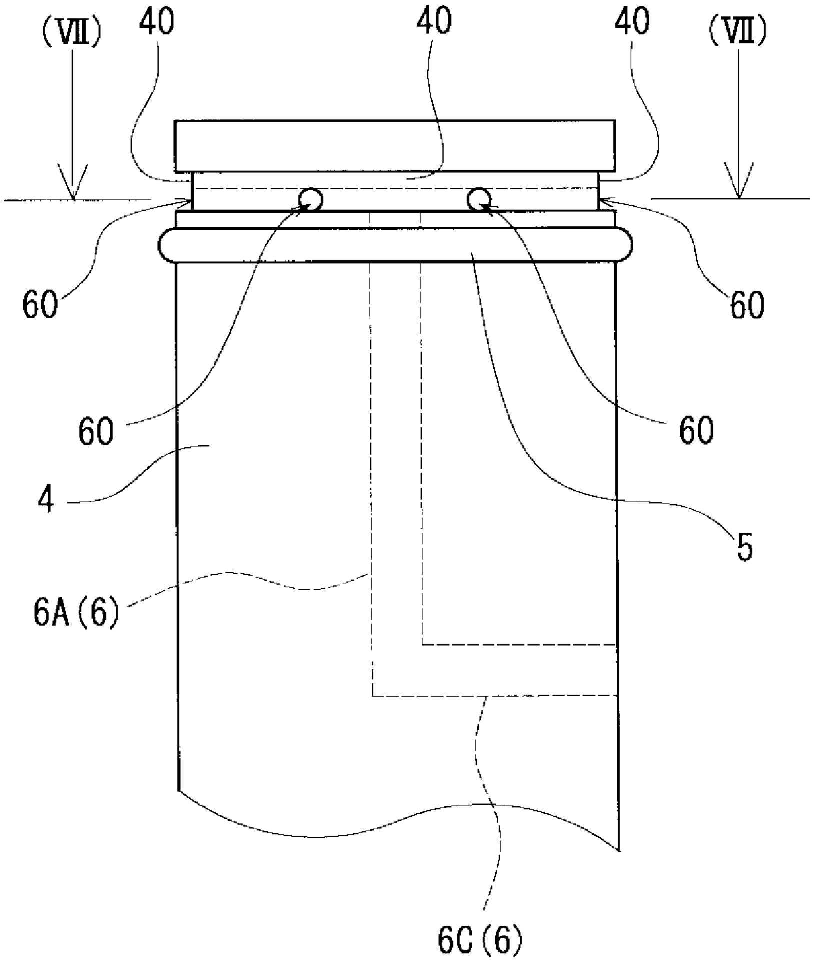
FIG. 6 is a schematic view of a lower punch of the powder compaction mold according to the second embodiment.

In this test example, the powder compact 80 was actually manufactured using the powder compaction mold 1 shown in the second embodiment, in which reference is made to FIGS. 5 to 7, by press-compacting a pure iron powder having an average particle size of 50 μm and was tested for productivity under the following test conditions. In this example, a TiN coating was deposited on the inner surface of the die 2. The size of the clearance in the first and third regions R1 and R3 of the clearance section 1*c* in the powder compaction mold 1 was 25 μm, and the size of the clearance in the second region R2 was four times the size of that clearance, i.e., 100 μm. The distance from the compression surface of the lower punch 4 to the upper end of the second region R2 was 4 mm. The distance from the compression surface of the lower punch 4 to the center of the intake ports 60 was 9 mm. The area of the compression surface (i.e., the cross-sectional area of the lower punch 4) was 900 $mm^2$. The passages 6A, 6B, and 6C had circular cross-sections with areas of 7 $mm^2$, 3 $mm^2$, and 7 $mm^2$, respectively. Here, unlike the example shown in FIG. 7, there were four passages 6B in Test Example 2. These passages 6B were arranged at regular intervals in the peripheral direction.

Condition D

In the powder filling step, the filling space 10 was filled with the powder 8 while gas was being discharged through the vent passage 6. In the press compaction step, the powder 8 was press-compacted while gas was being discharged through the vent passage 6. In both steps, gas was discharged such that the flow rate of gas through the vent passage 6 for gas venting without filling the filling space 10 with the powder 8 was 3 m/sec or more. The pressing speed (the moving speed of the upper punch 3) was 5 mm/sec, 7 mm/sec, 10 mm/sec, 12 mm/sec, or 15 mm/sec.

Condition E

Condition E were identical to Condition D except that the seal member 5 was not used.

Condition F

Gas was not discharged through the vent passage 6 in the powder filling step or the press compaction step. That is, the powder compact 80 was manufactured by a method similar to conventional methods for manufacturing powder compacts. The pressing speed was 5 mm/sec, 7 mm/sec, 10 mm/sec, 12 mm/sec, or 15 mm/sec.

Test Results

The packing density of the powder 8 for Conditions D, E, and F above were determined. The packing density was calculated from the volume of the filling space and the mass of the finished powder compact 80. The calculation results are shown in Table 2 below.

The powder compact 80 was also visually inspected for rupture as the pressing speed was varied. These results are also shown in Table 2 below.

TABLE 2

| | | Conditions | | |
|---|---|---|---|---|
| | | D | E | F |
| | | Packing density ($g/cm^3$) | | |
| | | 3.74 | 3.68 | 3.56 |
| Pressing speed (mm/sec) | 5 | Compactable | Compactable | Compactable |
| | 7 | Compactable | Compactable | Ruptured |
| | 10 | Compactable | Compactable | Ruptured |
| | 12 | Compactable | Ruptured | Ruptured |
| | 15 | Ruptured | Ruptured | Ruptured |

As shown in Table 2, the packing density of the powder 8 in the filling space 10 for Condition D, where gas was vented during filling with the powder 8, was 3.74 $g/cm^3$. The packing density of the powder 8 in the filling space 10 for Condition E, where gas was vented during filling with the powder 8 without using the seal member 5, was 3.68 $g/cm^3$. In contrast, the packing density of the powder 8 in the filling space 10 for Condition F, where gas was not vented during filling with the powder 8, was 3.56 $g/cm^3$. These results demonstrate that filling the filling space 10 with the powder 8 while venting gas from the filling space 10 allows a powder compact 80 with high density to be manufactured without increasing the size of the filling space 10. The results also demonstrate that a sufficiently small clearance section 1*c* between the die 2 and the lower punch 4 allows gas to be sufficiently vented from the filling space 10 without the seal member 5 and thus allows a powder compact 80 with high density to be manufactured.

As shown in Table 2, the powder compact 80 was manufactured without rupture under Condition D, where gas was vented during the press compaction of the powder 8, for pressing speeds of 5 to 12 mm/sec. The powder compact 80 was also manufactured without rupture under Condition B, where gas was vented during the press compaction of the powder 8 without using the seal member 5, for pressing speeds of 5 to 10 mm/sec. In contrast, the powder compact 80 was manufactured without rupture under Condition F, where gas was not vented during the press compaction of the powder 8, only for a pressing speed of 5 mm/sec. A comparison between the results for Test Example 2 and the results for Test Example 1 demonstrates that the formation of the recess 40 near the intake ports 60 provides the advantageous effect of improving the pressing speed. A comparison between the test results for Condition E and the test results for Condition F also demonstrates that the advantageous effect of improving the pressing speed can be achieved without the seal member 5.

REFERENCE SIGNS LIST

1 powder compaction mold
10 filling space
1*c* clearance section
R1 first region
R2 second region
R3 third region
2 die
3 upper punch
4 lower punch
40 recess
5 seal member
4A, 4B, 4C punch segment
4X core rod
6 vent passage
60 intake port
6A axial passage
6B radial passage
6C external connection passage
6D curved passage
7 suction unit (vacuum pump)
70 control unit
8 powder
80 powder compact
9 powder feed unit

The invention claimed is:

1. A method for manufacturing a powder compact using a powder compaction mold, wherein the powder compaction mold comprises a die and upper and lower punches configured to fit into the die, the powder compaction mold being configured to compress a powder between the upper and lower punches to manufacture the powder compact, wherein, of the members forming the powder compaction mold, at least one of two members in sliding contact with each other has therein a vent passage through which gas is vented from a filling space for the powder surrounded by the die and the lower punch to an outside of the powder compaction mold, wherein the vent passage has a gas intake port that is open to a clearance section formed between the two members and connecting to the filling space, wherein, the clearance section is divided into, in a direction along the sliding contact between the two members, a first region on the filling space side, a second region including the intake port, and a third region other than these regions, the powder compaction mold has a wider clearance in the second region than in the first and third regions, wherein the clearance in the second region varies in the direction along the sliding contact between the two members, wherein the clearance in the second region is narrowest proximate the third region and becomes gradually wider toward the first region, and wherein the gas intake port is open on a surface defining the second region and the gas intake port is arranged at a position adjacent to the third region, the method comprising:

a powder filling step of filling the filling space with the powder;

a press compaction step of compressing the powder between the upper and lower punches to obtain the powder compact; and a removal step of moving the die and the lower punch relative to each other to remove the powder compact from the powder compaction mold, wherein gas is vented from the filling space through the vent passage in at least one of the powder filling step, the press compaction step, and the removal step.

2. The method for manufacturing a powder compact according to claim 1, wherein a pressure of 0.05 MPa or less is reached in the filling space in the press compaction step.

3. The method for manufacturing a powder compact according to claim 1, wherein the venting is started when the upper punch is inserted into the die and is terminated when the upper punch is withdrawn from the die.

4. The method for manufacturing a powder compact according to claim 1, wherein a width of the clearance in the second region varies gradually along the sliding contact between the two members.

* * * * *